(12) United States Patent
Heil (10) Patent No.: US 11,207,842 B2
(45) Date of Patent: Dec. 28, 2021

(54) HEATING UNIT FOR HEATING PACKAGE SLEEVES AND APPARATUS COMPRISING SUCH A HEATING UNIT

(71) Applicant: SIG Technology AG, Neuhausen am Rheinfall (CH)

(72) Inventor: Michael Heil, Moenchengladbach (DE)

(73) Assignee: SIG Technology AG, Neuhausen am Rheinfall (CH)

( * ) Notice: Subject to any disclaimer, the term of this patent is extended or adjusted under 35 U.S.C. 154(b) by 695 days.

(21) Appl. No.: 15/755,847

(22) PCT Filed: Aug. 19, 2016

(86) PCT No.: PCT/EP2016/069686
§ 371 (c)(1),
(2) Date: Feb. 27, 2018

(87) PCT Pub. No.: WO2017/036817
PCT Pub. Date: Mar. 9, 2017

(65) Prior Publication Data
US 2018/0326671 A1    Nov. 15, 2018

(30) Foreign Application Priority Data
Aug. 28, 2015  (DE) .................... 10 2015 114 380.1

(51) Int. Cl.
*B29C 65/10* (2006.01)
*B65B 51/20* (2006.01)
*B29C 65/78* (2006.01)
*B29C 65/00* (2006.01)
(Continued)

(52) U.S. Cl.
CPC .......... *B29C 65/103* (2013.01); *B29C 65/787* (2013.01); *B29C 65/7882* (2013.01);
(Continued)

(58) Field of Classification Search
CPC ............................................. B29C 65/10–103
(Continued)

(56) References Cited

U.S. PATENT DOCUMENTS 3,120,089 A * 2/1964 Egleston ............. B29C 66/4322
53/565
3,207,049 A    9/1965 Monroe et al.
(Continued)

FOREIGN PATENT DOCUMENTS

CN    203020576 U    6/2013
CN    204250481 U    4/2015
(Continued)

*Primary Examiner* — David P Angwin
*Assistant Examiner* — Nicholas A Ros
(74) *Attorney, Agent, or Firm* — The Webb Law Firm (57) ABSTRACT

A heating unit is described and illustrated including at least two heating devices for at least partially heating with hot air end areas of package sleeves to be sealed, wherein the heating unit has an air supply device for supplying air to be heated to the heating devices, wherein the heating devices each have a heating element for producing hot air and a nozzle unit for blowing hot air produced in the heating device against the end area of the package sleeve. In order to be able to increase the leak tightness of the sealed end areas of the package sleeves without having to accept an excessive outlay and effort in terms of the equipment and/or in terms of the method for this, it has been proposed that the heating devices are each separately connected to the air supply device by means of at least one holder and are each separately held on the air supply device by means of the at least one holder.

13 Claims, 7 Drawing Sheets

(51) Int. Cl.
*B65B 65/00* (2006.01)
*B29L 31/00* (2006.01)
*B29K 705/02* (2006.01)

(52) U.S. Cl.
CPC ...... *B29C 66/1122* (2013.01); *B29C 66/4326* (2013.01); *B29C 66/43122* (2013.01); *B29C 66/72321* (2013.01); *B29C 66/72328* (2013.01); *B29C 66/72341* (2013.01); *B29C 66/72343* (2013.01); *B29C 66/73921* (2013.01); *B29C 66/80* (2013.01); *B29C 66/8432* (2013.01); *B65B 51/20* (2013.01); *B65B 65/00* (2013.01); *B29C 66/71* (2013.01); *B29C 66/8167* (2013.01); *B29C 66/8322* (2013.01); *B29K 2705/02* (2013.01); *B29L 2031/7166* (2013.01); *B65B 65/003* (2013.01)

(58) Field of Classification Search
USPC .................................. 219/243; 493/133–134
See application file for complete search history.

(56) References Cited

U.S. PATENT DOCUMENTS

| | | | | |
|---|---|---|---|---|
| 3,249,024 A | * | 5/1966 | Shiu | B31B 50/00 493/8 |
| 3,331,293 A | * | 7/1967 | Mullaney | B29C 65/1467 493/134 |
| 3,392,458 A | | 7/1968 | Braun | |
| 3,456,419 A | | 7/1969 | Vadas et al. | |
| 3,566,762 A | * | 3/1971 | Vadas | B65B 3/025 493/134 |
| 3,668,369 A | * | 6/1972 | Howe | F24H 3/0405 219/243 |
| 3,789,746 A | * | 2/1974 | Martensson | B29C 66/81465 53/563 |
| 6,149,566 A | * | 11/2000 | Nishio | B29B 13/025 493/133 |

FOREIGN PATENT DOCUMENTS

| | | |
|---|---|---|
| CN | 204846526 U | 12/2015 |
| DE | 1786440 A1 | 11/1970 |
| DE | 1761315 A1 | 5/1971 |
| DE | 3740426 A1 | 6/1989 |
| EP | 0832732 A2 | 4/1998 |
| EP | 0938965 A2 | 9/1999 |
| GB | 1001598 U | 11/1961 |
| JP | 1321993 A | 12/1989 |
| JP | 2235734 A | 9/1990 |
| JP | 2138103 U | 11/1990 |
| JP | 11240083 A | 9/1999 |
| JP | 200874482 A | 4/2008 |
| JP | 2008296918 A | 12/2008 |

* cited by examiner

HEATING UNIT FOR HEATING PACKAGE SLEEVES AND APPARATUS COMPRISING SUCH A HEATING UNIT

CROSS-REFERENCE TO RELATED APPLICATIONS

This application is the United States national phase of International Application No. PCT/EP2016/069686 filed Aug. 19, 2016, and claims priority to German Patent Application No. 10 2015 114 380.1 filed Aug. 28, 2015, the disclosures of which are hereby incorporated in their entirety by reference.

The invention relates to a heating unit comprising at least two heating devices for at least partially heating with hot air end areas of package sleeves to be sealed, wherein the heating unit has an air supply device for supplying air to be heated to the heating devices, wherein the heating devices each have a heating element for producing hot air and a nozzle unit for blowing hot air produced in the heating device against the end area of the package sleeve. The invention also relates to an apparatus for filling packages, in particular with (fluid) foodstuffs, having a heating unit for at least partially heating with hot air end areas of package sleeves to be sealed, having a sealing unit for closing and welding the end areas of the heated package sleeves in a liquid-tight manner and having a filling device for filling package sleeves closed on at least one side. In addition, the invention relates to a method for forming packages, in particular cardboard composite packages.

Various apparatuses are known for filling packages with products, in particular in the form of foodstuffs. The packages are preferably filled with fluid foodstuffs. Packages are used which are open on the top side, in order to provide an opening for filling. The packages can, for example, be cardboard composite packages which are formed from a packing material in the form of a laminate comprising a cardboard layer and outer, in particular thermoplastic, plastic layers, for instance consisting of polyethylene (PE). The cardboard provides the packages with sufficient stability, so that the packages can be easily handled and, for example, can be stacked. The plastic layers protect the cardboard from moisture and allow the packing material to be sealed to form a leakproof package. In addition, further layers can be provided, such as an aluminium layer which prevents oxygen and other gases diffusing through the package.

The packages can, preferably in a filling machine, be produced from a package precursor. Packing material blanks can be used as package precursors, for example, consisting of packing material which can be prefabricated as required, namely, for example, by sealing longitudinal edges to form a package blank in the form of a package sleeve. Corresponding package sleeves are typically drawn onto mandrels of a so-called mandrel wheel, wherein the cross-section of the mandrels corresponds to the inner cross-section of the package sleeve which initially protrudes outwards over the mandrel. This protruding area of the package sleeve is heated by means of hot air by a heating unit, in order to activate the end areas of the package sleeve, in particular the area forming the base or the area forming the gable of the package sleeve. The temperature of the package sleeve is at least in sections raised to the extent that the outer plastic layer, which is typically a thermoplastic, in particular polyolefin, more preferably polyethylene, can be sealed i.e. welded. This takes place preferably with other activated areas of the corresponding end area of the package sleeve in each case. The end area of the package sleeve is folded against the front side of the mandrel and pressed there. After cooling the package sleeve, a liquid-tight package base or package top is formed in this way. Since this basically makes no appreciable difference for the process of filling packages, in the following particularly the closed part pointing downwards during filling is regarded as the base of the package and particularly the upper part of the package which is still unclosed during filling is regarded as the top of the package. However, which alignment the package is handled in after filling and final closing, i.e. where ultimately bottom or top is in the packaging, is not fundamentally important for the object to be achieved by the invention. In other words, it makes no great difference whether the packages are filled through the still open base area or through the still open top area of the package.

For filling, the packages which are open on one side are channelled into a sterilisation zone of the filling machine, for instance by introducing the packages one after the other into cells of a conveying device. The packages are then conveyed through the sterilisation zone of the filling machine at a defined speed and at a defined distance apart from one another, where the packages as required are pre-heated with hot sterile air before sterilisation of the packages, for example with hydrogen peroxide, and as required drying with sterile air take place. The sterilised packages are then passed on to the filling and sealing zones and preferably filled with a fluid foodstuff, such as a beverage, there. Subsequently, the package is also closed, conveyed out of the filling and sealing zones by means of the conveying device and finally removed from the cells of the conveying device.

In some filling machines, the packages are conveyed in a straight line through the filling machine by the conveying machine. Corresponding filling machines are also referred to as longitudinally operating machines. In other filling machines, the so-called rotary operating machines, the packages describe a more or less arc-shaped movement which can comprise one circular arc section or a plurality of circular arc sections.

Heating units of known filling machines usually have a plurality of heating devices, since in filling machines typically a plurality of mandrel wheels are operated in parallel next to one another. Usually, there are four or six parallel mandrel wheels. Each heating device then serves to heat another package sleeve in parallel, in particular the end area to be sealed in each case which can optionally be the subsequent base or the subsequent top of the package. In order to supply the air to be heated to the heating devices, usually individual groups of heating devices are connected to an air supply device. The air to be heated is then heated separately by heating elements, for instance in the form of heating cartridges, to about 3000 C to 4000 C in the heating devices. Thereafter, the hot air is blown in a targeted manner onto the end areas of the package sleeves via nozzle units. Due to the high temperatures, the packing material of the package sleeves can be activated in a very short time, in particular soften, such that the packing material can be sealed and the corresponding end area of the package sleeve can be closed.

In practice, however, it is difficult to activate the ends of the package sleeves to be heated precisely and reliably over a prolonged period of time. Over prolonged periods of time, inaccuracies consistently occur when heating the end areas of the package sleeves. The packing material is, for example, locally over-activated or insufficiently activated, which can be due to the fact that the distance from the packing material to the hot air flowing out of the nozzle unit is a bit too short or a bit too great. The excessive or insufficient activation of the packing material can in any event result in the sealed end area not being made sufficiently leak-proof. Liquid can already leak out of the package after filling. However it can also happen that the sealed end area only becomes leaky later after increased mechanical stress.

Therefore, the invention is based on the object of developing and enhancing the heating unit, the apparatus and the method respectively of the type mentioned at the outset and previously described in more detail such that the leak tightness of the sealed end areas of the package sleeves can be increased without having to accept an excessive outlay and effort in terms of the equipment and/or in terms of the method for this.

This object is achieved with a heating unit according to the preamble of Claim 1 by the heating devices being each separately connected to the air supply device by means of at least one holder and being each separately held on the air supply device by means of the at least one holder.

The previously mentioned object is also achieved with an apparatus according to the preamble of Claim 15 by designing the heating device according to any one of Claims 1 to 14.

Besides that, the previously mentioned object is achieved according to Claim 16 by a method for forming packages, in particular cardboard composite packages, in which in each case an end area of at least two package sleeves is heated in parallel and at least partially, in which the end areas of the at least two package sleeves in order to heat them in parallel and at least partially are each at least partly inserted into a gap of a heating device, preferably of a heating unit according to any one of Claims 1 to 14 or an apparatus according to Claim 15, and in the gap are blown against with hot air, in which the at least partially heated end areas of the at least two package sleeves, preferably in parallel, are closed by sealing, in which air to be heated is supplied to the at least two heating devices by means of an air supply device, and in which the at least two heating devices are each separately held on the air supply device by means of at least one holder.

A distinct thermal separation of the heating devices from one another can be effected by holding the heating devices separately on the air supply device. The air supply device is not only used for supplying the air to be heated, but also for securing and fixing the heating devices. Hence, the heating devices are to a significant extent connected via the air supply device. When the heating unit is in operation, the air supply device is cooled from the inside by the flow-through of air to be heated and can in this way dissipate the heat emitted by the heating devices to the air supply device via thermal conduction very well. The heat is therefore not or only slightly transferred from a heating device to other areas of the heating unit, let alone to adjacent heating devices. Hence, thermal influencing between individual heating devices by a thermal expansion of the heating unit is also as such prevented to the greatest possible extent. As a result, the preset distance between the heating devices is also essentially retained over a prolonged period of operation.

The heat absorbed by the air to be heated is also conducted back in the direction of the heating devices due to the direction of flow of the air and dissipated over the heating devices, which favours the thermal relief of load on the heating unit on the whole and reduces impairment between the heating devices. Thermal material expansions which result in the predetermined positions of the nozzle units, which beforehand have been exactly aligned with the associated mandrel wheels and hence with the end areas of the package sleeves held on the mandrel wheels, changing, are prevented by the described thermal decoupling. Even slight changes can adversely affect the activation of the packing materials to the point of a local over-activation and/or a locally insufficient activation.

The holders, with which the heating devices are connected separately to the air supply device, can also be formed with a relatively small material cross-section, in order to reduce the thermal conduction via the holder to the air supply device. The material cross-section is understood as the material cross-section which is relevant for heat transfer via thermal conduction, i.e. in particular perpendicular to the direction of the thermal conduction. The corresponding material cross-section can be different at different places on the holder. At least one very small material cross-section and/or large areas with small cross-sections is principally preferred, in order to offer the highest possible heat transfer resistance to the thermal conduction.

By means of the separate holding elements, the thermal conduction between the heating devices is consequently also limited. As required, each heating device can also be held on the air supply device by means of a plurality of holders. Then, for example, the material cross-section of the holder particularly contributing to the thermal conduction which, for instance, is arranged on a particularly hotter area of the heating device, can be formed smaller. In order to guarantee the required mechanical stability, a further holder can then be used which is arranged on a colder area of the heating device. Hence, via the additional material cross-section contributing to the thermal conduction which is consequently, for example, arranged essentially perpendicular to the thermal conduction, less heat is dissipated due to the lower temperature difference, whilst via the other material cross-section less heat is also dissipated due to the higher thermal conduction resistance of a smaller material cross-section.

Below, the heating unit, the apparatus for filling packages and the method for forming packages are described together to avoid unnecessary repetition and for clearer comprehension without specifically differentiating between the heating unit, the apparatus and the method. However, it will be obvious to the person skilled in the art from the context which features regarding the heating unit, regarding the apparatus for filling the packages and regarding the method for forming packages respectively are preferred.

In a first preferred embodiment of the heating unit, the at least one holders are connected on a distribution pipe to the air supply device. This is easy in terms of design and allows a good thermal separation of the heating devices from one another. The distribution pipe can provide a large volume flow of air to be heated which removes heat. In addition, the distribution pipe is fundamentally bigger and more solid. Therefore, the distribution pipe can store more heat at a lower temperature. This has the further advantage that the distribution pipe can provide a better buffer effect in the case of temperature deviations. Furthermore, provision can be made for the heating devices to at least also be held on the distribution pipe of the air supply device by means of the corresponding separate holders. In this way, further holders for holding and fixing the heating devices can as required be omitted or be made less solid. Excessive heat conduction via these additional holders can in this way be prevented or in any case reduced.

The thermal decoupling of the heating devices from one another can also be improved by fluidly connecting the heating elements of the at least two heating devices in each case to the air supply device by means of the at least one holder. Thus, at least one channel can be respectively provided by the at least one holder, this channel being supplied with air via the air supply device. The air can then flow through the channels and correspondingly cool the holders. Then, less heat is emitted by the heating devices to the air supply device. This advantage can as required be further boosted by designing the at least two heating devices to be supplied with air to be heated by means of the holder. Then, the air is also used for producing hot air and as required more air for cooling can also be conducted through the channels. For reasons to do with cooling and from a design point of view, it is particularly appropriate if the heating devices are exclusively supplied with air to be heated by means of the at least one separate holder. In addition, the corresponding pre-heating of the air to be heated when flowing through the at least one holder can result in an energy saving for providing the hot air because heat losses are reduced.

Alternatively or additionally, the at least one holder in each case has at least two separate channels connected to the air supply device, in particular to a distribution pipe, for supplying air to be heated to the heating devices. A plurality of channels have the advantage that the heat transfer area between the air and the respective holder tends to increase. However, too many channels are complex in terms of design and increase the pressure loss when the holders are flowed through.

The connection of the heating devices to the air supply device by means of the at least one holder is particularly effective if the respectively at least one holder is provided on an area assigned to the nozzle unit of the heating device, on an area of the heating device assigned to the heating element or on an area of the heating devices assigned to both areas. Then, the holders are fundamentally exposed to particular thermal stresses, so that the previously described effects through the connection and/or design of the at least one holder have a particular influence. This can, for example, particularly apply if the at least one holder is provided on the end of the heating element assigned to the nozzle unit or on an area of the heating device between the nozzle unit and the heating element. Corresponding areas are namely as required particularly hot and in some circumstances have to be particularly well held and fixed, in order to ensure that the package sleeves are precisely heated by precisely positioning the nozzle units.

In order to ensure that the heating devices are securely held and reliably fixed, alternatively or additionally the heating devices can each be separately connected to the air supply device by means of at least two holders. Inadvertent twisting of the heating devices, for example, can be counteracted by the at least two holders. Since both holders are connected to the air supply device conveying the air to be heated, heat can only be emitted to a limited extent by the heating devices via the holders to the heating unit on the whole or to the adjacent heating devices. In order to exploit the holders efficiently and, as required, render further connections of the heating devices unnecessary, it is particularly preferred if the at least two heating devices are each separately held on the air supply device by means of the at least two holders. The heating devices are fixed and supported by the air supply device if required.

In order to cool the heating devices on the outside, for instance in the connection area of the holders, the heating devices can each have at least one channel which air still to be heated can flow through. The at least one channel is located outside the heating element, in particular on at least one side of the heating element. It is particularly advantageous if the at least one channel or plurality of channels at least partly, in particularly at least essentially, encompass the heating element. In this way, more heat can be dissipated by the air to be discharged over a larger area. This applies all the more if the at least one channel is arranged at least essentially circumferentially to at least one part of the heating element.

This can be achieved easily in terms of design if an annular channel is formed around the heating element. Alternatively or additionally, the heating element can be designed in such a way that air still to be heated in the at least one channel is at least partly conducted in a direction which is aligned opposite or at least partly opposite to the direction of flow of the air through the heating element. The heating element and the at least one channel can then, as it were, be at least partly operated in reverse flow. Thus, the air at least partly flows in opposite directions in the at least one channel and in the at least one heating element. In other words, the flows in the two sections have at least direction components which are opposed to one another, so that the flows on the whole run at least obliquely to one another. For example, this is achieved by a redirection of the flow direction of the air to be heated after the at least one channel and before the heating element of more than 90°, in particular at least essentially by 180°. This is also easily achieved in terms of design. The air to be heated can be pre-heated in the previously described way. The heat output to be emitted by the heating element can thereby be reduced. In addition, the air to be heated can be advantageously introduced into the end of the heating unit used by the nozzle unit.

In order to regulate the rate of flow of air to be heated to the heating element as required a regulating unit can in each case be integrated into the heating devices. The regulating unit can have an annular gap for easy and precise adjustability which has a free flow cross-section for the air to be heated, the dimensions of which can be varied. For example, the annular gap can be formed by a conical punch and a conical intake, which are correspondingly designed in relation to one another. The punch can then be guided in a thread such that the punch by rotating in the thread is moved into the intake reducing the free flow cross-section for the air to be heated or is moved out of the intake enlarging the free flow cross-section. The parameter monitored for regulating the rate of flow can, for example, be the overpressure issuing at the openings, which can, for example, be elevated in the range between 0.1 bar and 0.8 bar compared to atmospheric pressure. Although it is advantageous to constantly monitor the rate of flow and where appropriate readjust the free flow cross-section, so that particularly uniform results are obtained and so that impending or occurring production rejects are detected early, in practice it can also suffice to manually adjust the flow cross-section. In the present case, a control unit for regulating the rate of flow is understood as part of the regulating unit.

In order to be able to heat the package sleeves effectively and in a precise manner, the nozzle unit can have an in particular square or rectangular circumferential gap for receiving one end of a package sleeve. Preferably, the nozzle units or the heating devices are as such movably held on the air supply device in such a way the nozzle units can be pushed onto the ends of the package sleeves. In order to heat the ends of the package sleeves, the gap can be delimited by inner and outer walls, at least one wall of which, in particular at least the inner one, has openings for hot air to flow out of.

The hot air is then blown onto the packing material at the desired place in each case. The amount of hot air which hits a certain section of the package sleeve can be set by arranging the openings, the number of openings and the size of the openings. As a result, how quickly and/or how strongly the corresponding section of the packing material is heated is at the same time controlled.

It is appropriate for sealing the end area of the package sleeve in a liquid-tight manner to form a base or top of the package if the corner areas are heated over a larger surface area than the areas in between. The corner areas namely overlap one another more markedly than is the case with the areas in between. Therefore, it is particularly preferred if the entire opening area formed by the individual openings is larger in at least one corner area than outside the at least one corner area. This can apply for the inner wall of the gap, the outer wall of the gap or for both walls of the gap.

Alternatively or additionally, the contour of openings formed by a plurality of openings can be at least essentially V-shaped in at least one corner area of the inner wall of the gap and/or of the outer wall of the gap. As a result, the contour of the heated corner area of the package sleeve can also be made V-shaped. This is advantageous for subsequently sealing the corresponding end of the package sleeve in a liquid-tight manner. The V-shaped contour can therefore preferably be provided in all corner areas of the inner and/or outer wall.

Since in particular the inner surfaces of the package sleeve are welded together, it is, however, fundamentally preferred that in particular the insides of the corresponding end of the package sleeve are heated with hot air. Consequently, it is fundamentally advantageous if the openings of the inner wall of the gap form a larger free flow cross-section overall than the openings of the outer wall of the gap.

Alternatively or additionally, the width of the gap, preferably essentially uniform, can be less than 3 mm, in particular less than 2 mm. Then, when package sleeves are inserted centrally, there is a suitable distance from the inner wall and the outer wall to blow hot air out of the corresponding heating devices against the packing material effectively and precisely.

The invention is explained in more detail below with the aid of the figures illustrating only one exemplary embodiment.

Figure 1:
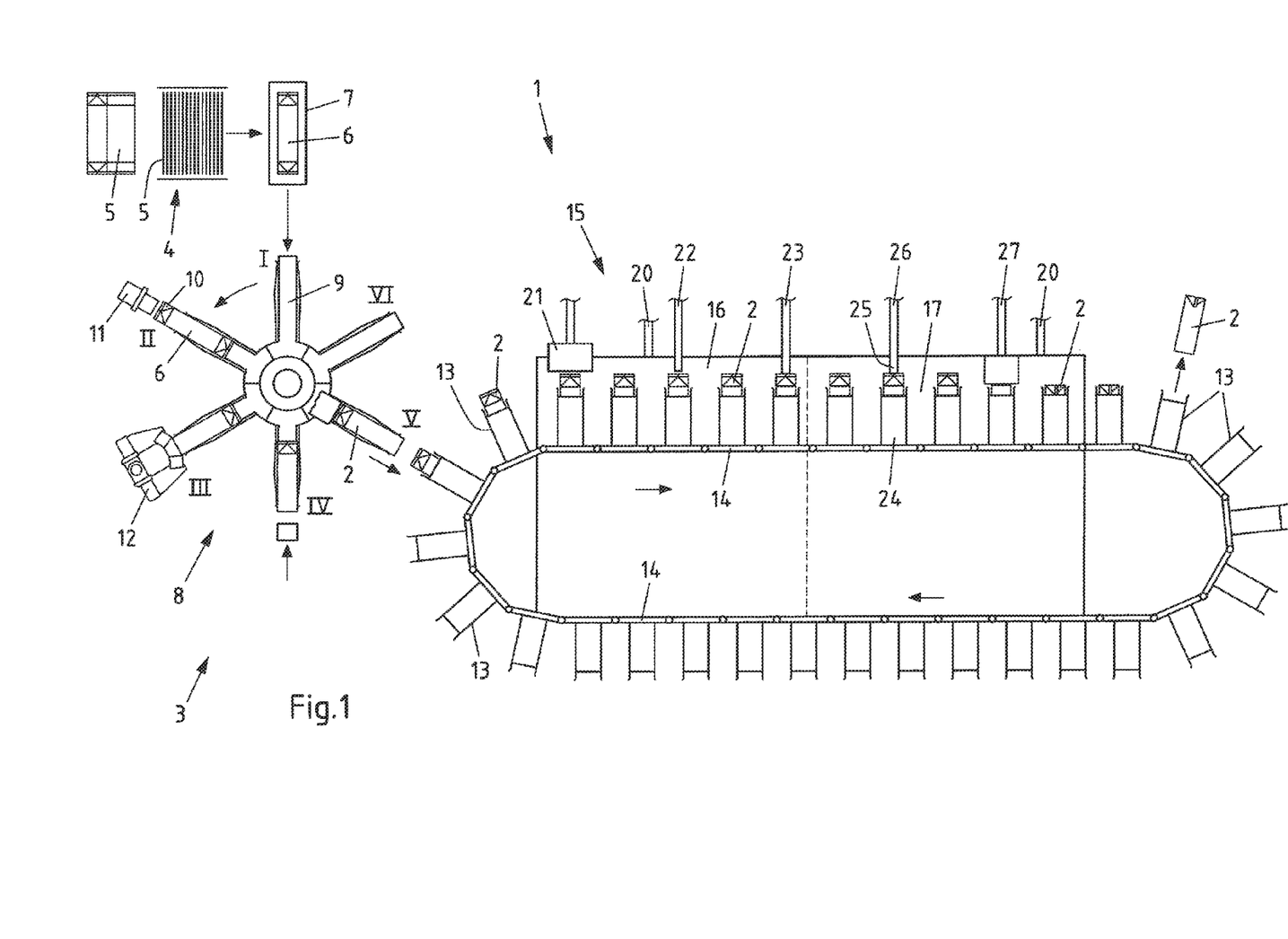
FIG. 1 shows an apparatus for filling packages in a schematic illustration.

An apparatus 1 for filling packages 2, in particular with fluid foodstuffs, i.e. a so-called filling machine, is illustrated in FIG. 1, comprising an apparatus 3 for forming packages 2. The illustrated and in this respect preferred apparatus 1 has a row of parallel processing lines, of which only one processing line is illustrated in FIG. 1. A batch 4 of package blanks 5 in the form of packing material blanks are assigned to each processing line, the longitudinal edges of which are sealed together and in this way form package sleeves 6 which are held available folded together. The package sleeves 6 are unfolded by a feed device 7, wherein, as required, an application device for applying pouring elements (not illustrated) to the package sleeves 6 can also be provided.

The apparatus 3 for forming the package 2 has a mandrel wheel 8 which in the illustrated and in this respect preferred case comprises six mandrels 9 and cyclically, i.e. step by step, rotates anticlockwise. In the first mandrel wheel position 1, a package blank 5 in the form of a package sleeve 6 is pushed onto the mandrel 9. Subsequently, the mandrel wheel 8 in the next mandrel wheel position II is rotated further, in which the end area 10 of the package sleeve 6 protruding with respect to the mandrel 9 is heated with hot air by means of a heating unit 11. In the next mandrel wheel position III, the heated end area 10 of the package sleeve 6 is pre-folded by a press 12 and in the following mandrel wheel position IV in the folded position tightly closed, in particular to form a base, is sealed by means of a sealing device which is not described in more detail. A package closed on one side is obtained in this way, which in the following mandrel wheel position V is removed from the mandrel 9 and passed on to a cell 13 of a continuous conveying device 14 operating in a circle. In the next mandrel wheel position VI, no production step is assigned to the mandrel 9. The number of mandrel wheel positions or mandrels and the processing steps provided there can, as required, deviate from the illustration according to FIG. 1 and the associated description.

The package 2, which is in the package carton stage, is conveyed with the open end pointing upwards in the associated cell 13 through a filling machine. As required, the package 2 could also be filled through the base area pointing upwards if the top area pointing downwards is closed for this. The package 2 reaches an aseptic chamber 15 which comprises a sterilisation zone 16 and a filling and sealing zone 17, through which the packages are conveyed from left to right in the conveying direction symbolised by the arrows. The packages 2 do not have to be conveyed in a straight line, but can also be conveyed in at least one arc or even in a circle.

Sterile air is supplied to the aseptic chamber 15 via corresponding sterile air connections 20. Hot sterile air is blown against the packages 2 successively by means of a pre-heating device 21. Subsequently, the packages 2 are sterilised, preferably by hydrogen peroxide, by means of a sterilising device 22, whereupon the packages 2 are dried by being exposed to sterile air by means of a drying machine 23 and after the transition from the sterilisation zone 16 to the filling and sealing zone 17 are brought into a filling position 24 below a filling outlet 25. There, the packages 2 are successively filled with foodstuffs 26. The filled packages 2 are then closed using a closing device 27 by folding the upper area of the package 2 and sealing it. The closed packages 2 are subsequently removed from the cells 13 of the conveying device 14. The cells 13 which are now empty are moved further in the direction of the mandrel wheel 8 by means of the conveying device 14, in order to receive further packages 2 there.

Figure 2:
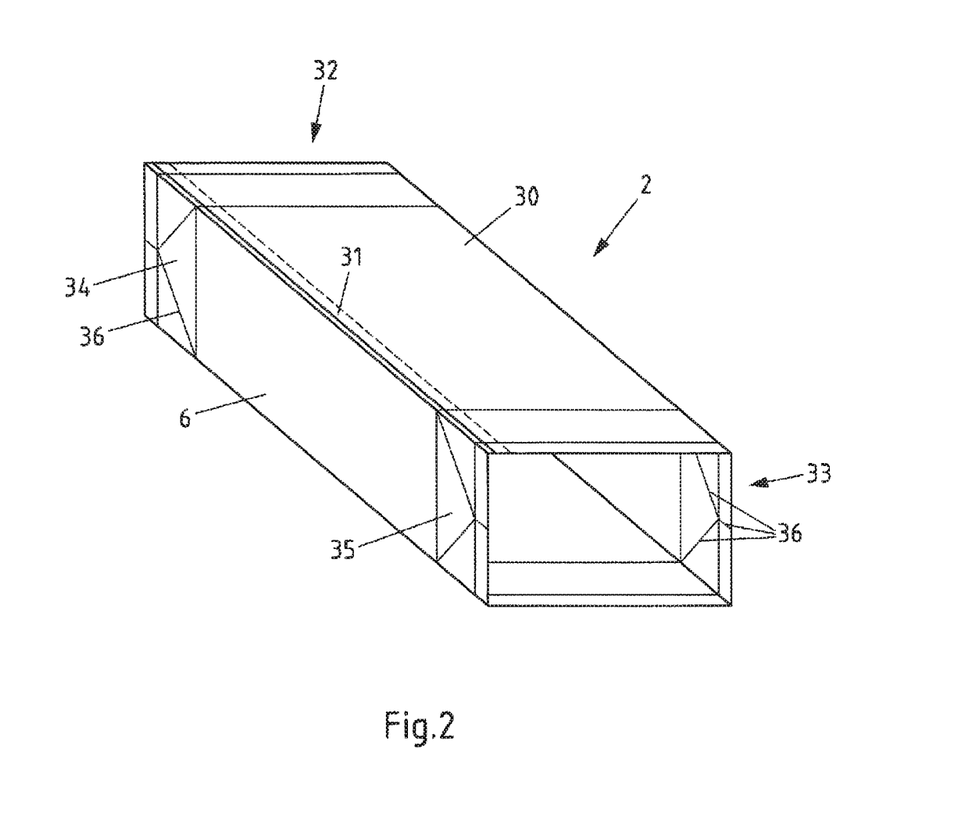
FIG. 2 shows a package sleeve produced in the apparatus according to FIG. 1 in a perspective view.

A package sleeve 6 is illustrated in FIG. 2 as it is, for example, heated in the previously described apparatus 1 and then closed on one side. The packages 2 are in particular cardboard composite packages consisting of a corresponding packing material 30 in the form of a laminate or packing material laminate having at least one cardboard layer, at least one barrier layer, for example consisting of aluminium, polyamide and/or an ethylene-vinyl alcohol, and outer layers consisting of a thermoplastic synthetic material, in particular polyethylene (PE). The longitudinal edges 31 of the packing material blank formed from the packing material 30 have already been sealed together. This means that the longitudinal edges of the packing material blank have been placed overlapping on top of one another and in this position have been welded together. A base forming area 34 for forming the base and a gable forming area 35 for forming the gable of the package 2 are provided at the two open ends 32, 33 of the package sleeve 6. The corresponding areas on the fold lines 36 provided for this are folded together for this purpose.

Figure 3:
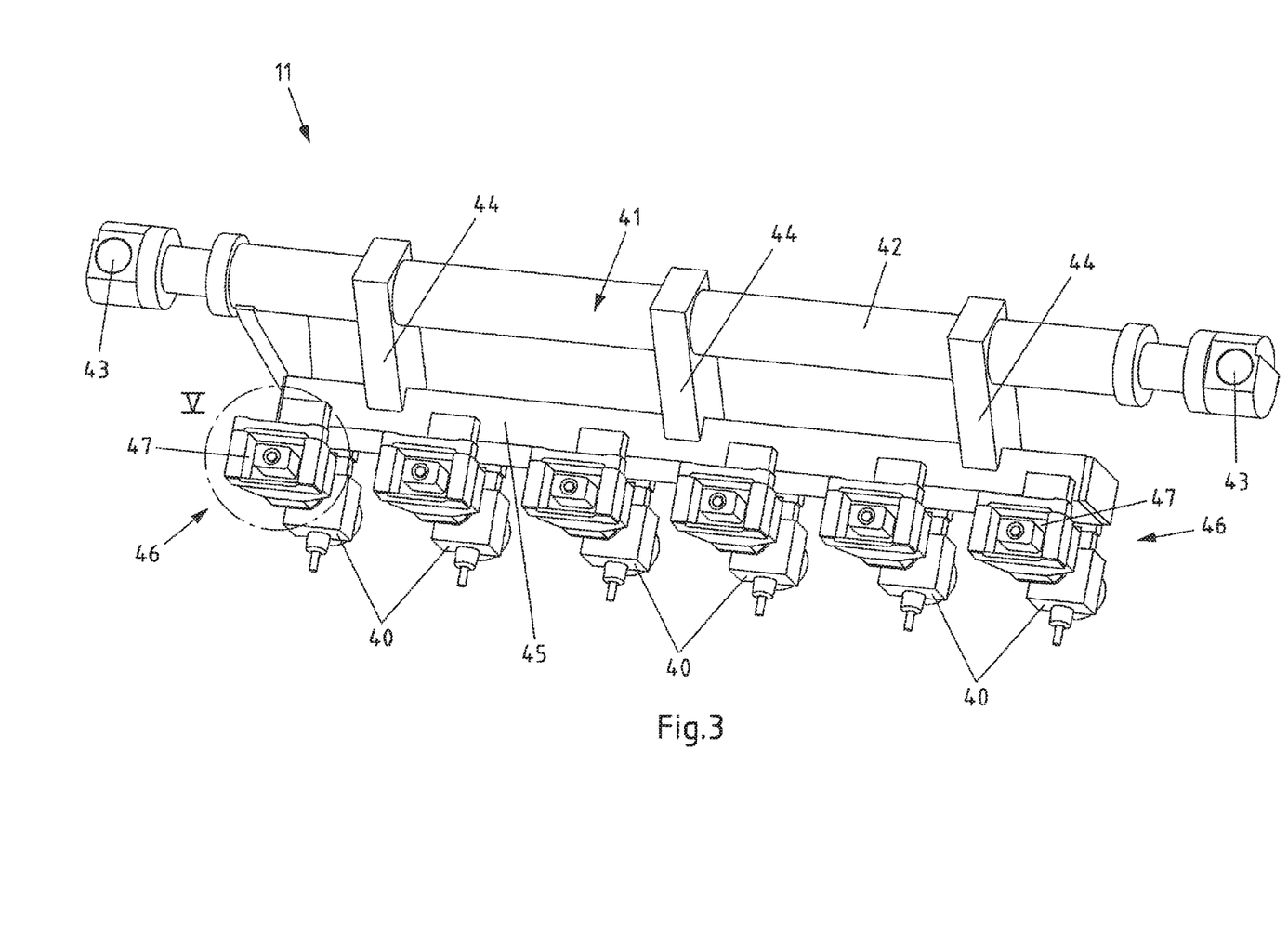
FIG. 3 shows a heating unit of the apparatus according to FIG. 1 in a perspective view.

A heating unit 11 of the apparatus 1 for filling packages is illustrated in FIG. 3 having six heating devices 40 arranged next to one another for partially heating with hot air end areas 10 of package sleeves 6 to be sealed. The heating unit 11 also has an air supply device 41 with a pivot-mounted supply pipe 42 for air to be heated. The air to be heated is supplied to the supply pipe 42 via lateral openings 43. The supply pipe 42 is connected by means of hollow connection channels 44 to a distribution pipe 45 from which the air to be heated is distributed to the individual heating devices 40. The illustrated and in this respect preferred heating devices 40 each have on their front end a nozzle unit 46 with a rectangular circumferential gap 47, into which in each case one end of a package sleeve 6 can be inserted, so that it can be partially heated by means of hot air heated in the heating device 40.

Figure 4:
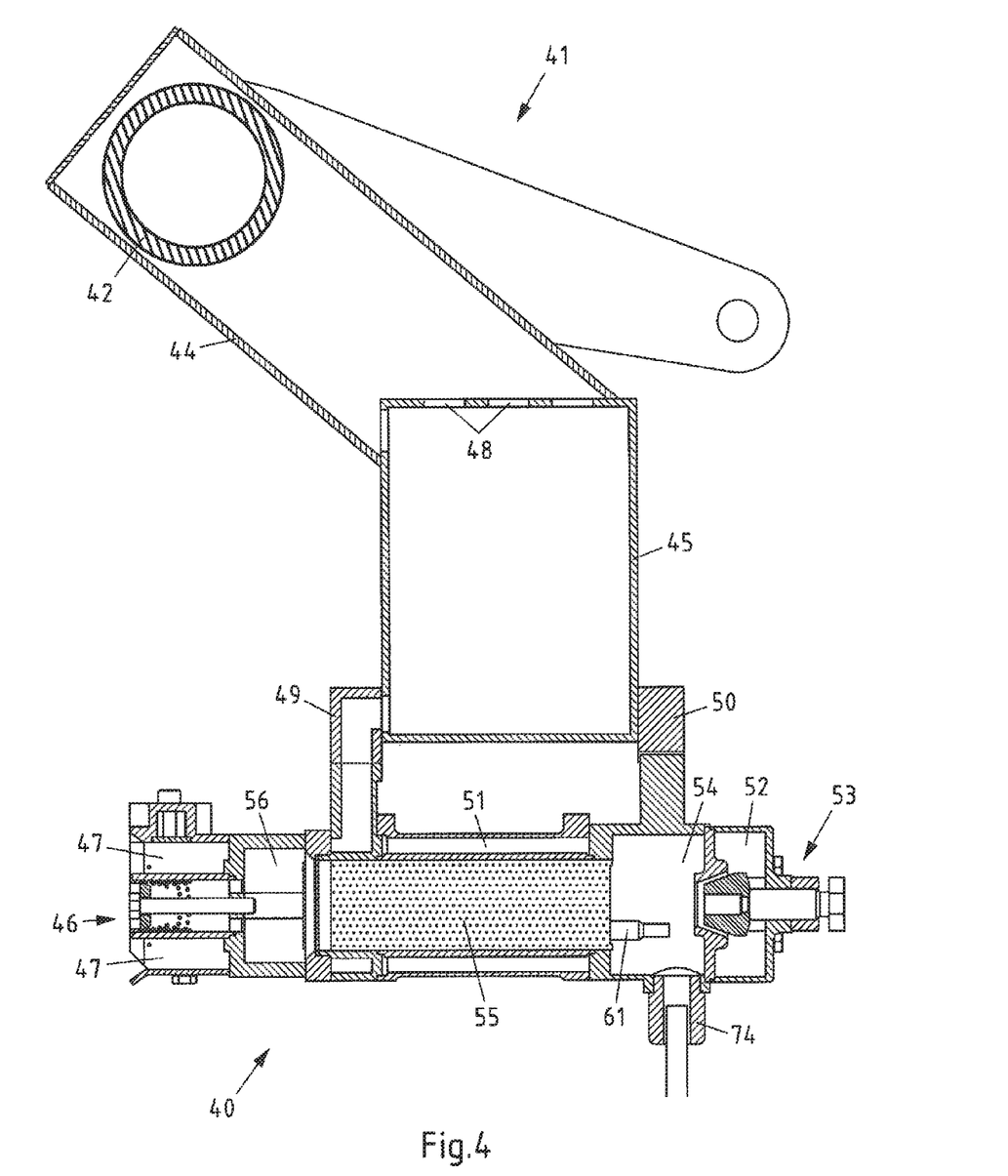
FIG. 4 shows a heating device of the heating unit according to FIG. 3 in a sectional view.

In FIG. 4, the heating unit 11 is illustrated in a cross-sectional view transverse to the distribution pipe 45 and to the supply pipe 42 and through a heating device 40. The air passes from the supply pipe 42 via connection channels 44 via corresponding openings 48 into a distribution channel 45 for the air to be heated. The heating devices 40 are each connected to the distribution channel 45 via two holders 49, 50 which hold the heating devices 40 on the distribution channel 45 and fix them with respect to the distribution channel 45. In the case of the illustrated and in this respect preferred heating devices 40, the holders 49, 50 of a heating device 40 are connected to the distribution channel 45 on opposite longitudinal sides thereof. A holder thereby forms the feed of air to be heated into the heating device.

The illustrated and in this respect preferred heating device 40 has an annular channel 51 for the air to be heated, in which the air is conveyed into the rear part of the heating device 40. There, the air passes into a metering chamber 52, from where by means of a regulating unit 53 for regulating the rate of flow of air to be heated the air to be heated passes into a heating chamber 54 in which an electrically heated heating element 55 flowed through by the air to be heated is provided. After leaving the heating element 55, the hot air enters a hot air chamber 56, via which the hot air passes into the nozzle unit 46. The nozzle unit 46 can receive an end area 10 of a package sleeve 6 to be sealed in the circumferential rectangular gap 47 and then this end area 10 of a package sleeve 6 to be sealed is preferably partially blown against by the hot air in a targeted manner in the gap 47 of the nozzle unit 46. The circumferential gap 47 does not have to be rectangular. The gap 47 can also be round, oval or otherwise multiangular, i.e. triangular or more than quadrangular. It is particularly appropriate if the at least one end area 10 of the at least two package sleeves 6 has a shape or contour which corresponds to the shape of the gap 47.

Figure 5:
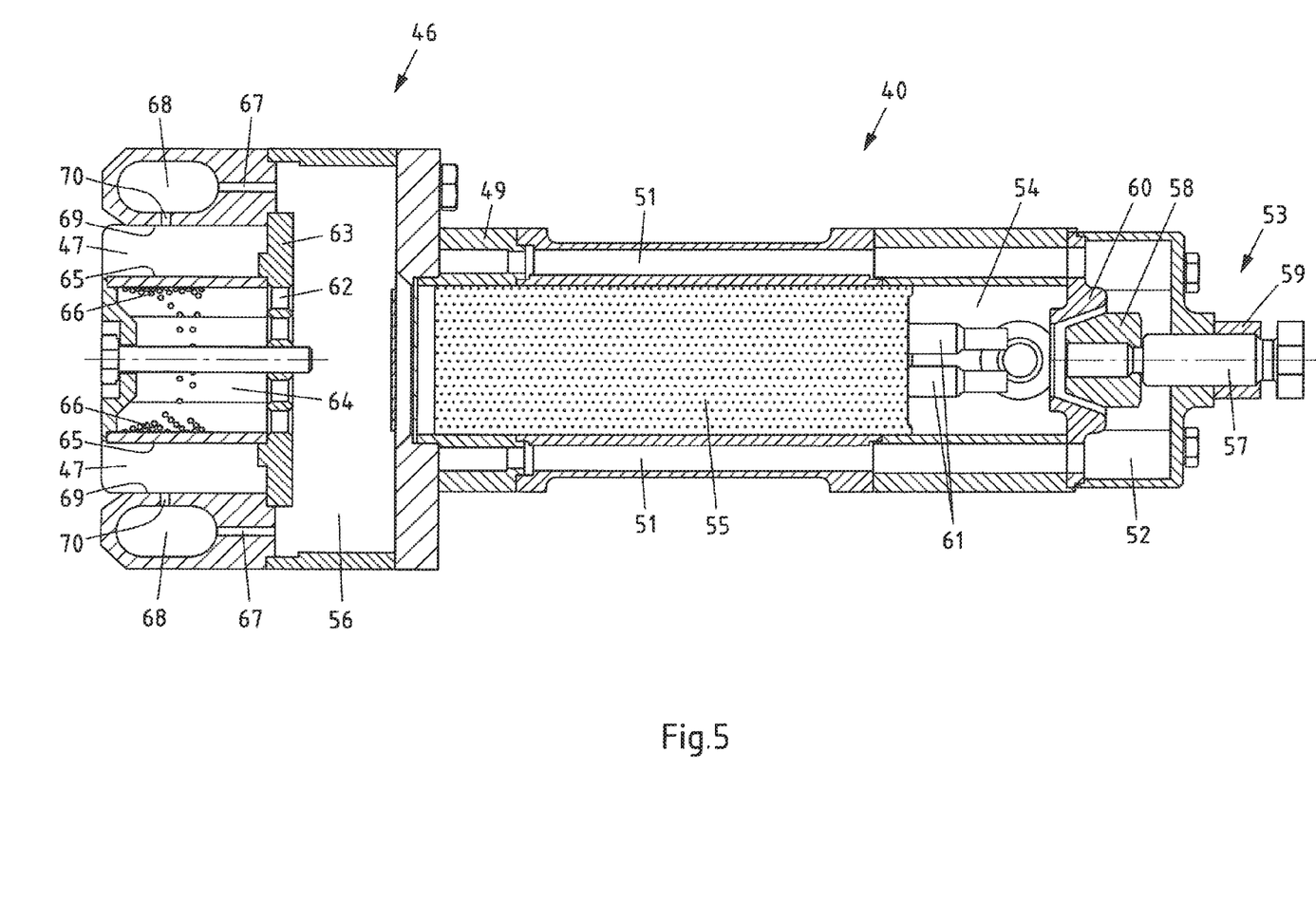
FIG. 5 shows the heating device from FIG. 4 in a further sectional view.

In FIG. 5, the heating device 40 is illustrated in detail and in a longitudinal section along a plane which is aligned perpendicular to the sectional plane according to FIG. 4. The heating element 55 is arranged centrally, which air to be heated flows through from right to left, while the air to be heated is heated. The air to be heated for this passes into the annular channel 51, which extends in the longitudinal direction of the heating element 55 and circumferentially to the heating element 55, by means of a holder 49 provided at the front, i.e. at the left, end of the heating element 55. Via the annular channel 51 the air to be heated passes into the rear part of the heating device 40 illustrated on the right. The metering chamber 52 is provided there, from which the air to be heated, metered flows out in the direction of the heating element 55. A regulating unit 53 is provided for metering the air flow and has a punch 57 with a conical end 58. The punch 57 is held rotatably in a thread 59, so that the punch 57 by rotating the same can be shifted back and forth. In the process, the distance from the conical end 58 of the punch 57 relative to the correspondingly conically shaped intake 60 is increased or the distance is reduced according to the direction of rotation of the punch 57. In this way, an annular gap forms between the conical end 58 of the punch 57 and the conical intake 60 with a varying free flow cross-section, so that the air flowing through the annular gap into the heating chamber 54 can be metered. Metering of the air flowing through the annular gap can be carried out particularly precisely if the conical areas are formed at a flat angle, so that for a relatively small flow cross-section change a relatively long adjustment travel of the punch 57 is required.

The heating element 55 in the form of a heating cartridge is provided in the heating chamber 54 and can be connected to an electrical power supply by means of an electrical connection 61. The heating element 55 acts as a heating resistor and heats the air flowing through, so that the air flows out of the heating element 55 into the hot air chamber 56 as hot air and subsequently the hot air flows, for example, through openings 62 of a perforated metal plate 63 for forming a laminar flow in a central area 64 of the nozzle unit 46. The central area 64 of the nozzle unit 46 forms the inner circumferential wall 65 of the gap 47 for receiving an open end 10 of a package sleeve 6. A row of openings 66 is provided in the inner wall 65, which in the illustrated and in this respect preferred heating device 40 are about the same size. The hot air flows through the openings 66 into the gap 47 and against one end of a correspondingly positioned package sleeve 6 as required. The hot air can also be supplied from the hot air chamber 56 via further channels 67 to an outer area 68 of the nozzle unit 46. The outer area 68 of the nozzle unit 46 forms the circumferential outer wall 69 delimiting the gap 47 for partly receiving the package sleeve 6. The hot air also flows out of the outer wall 69 through individual openings 70 into the gap 47.

Figure 6:
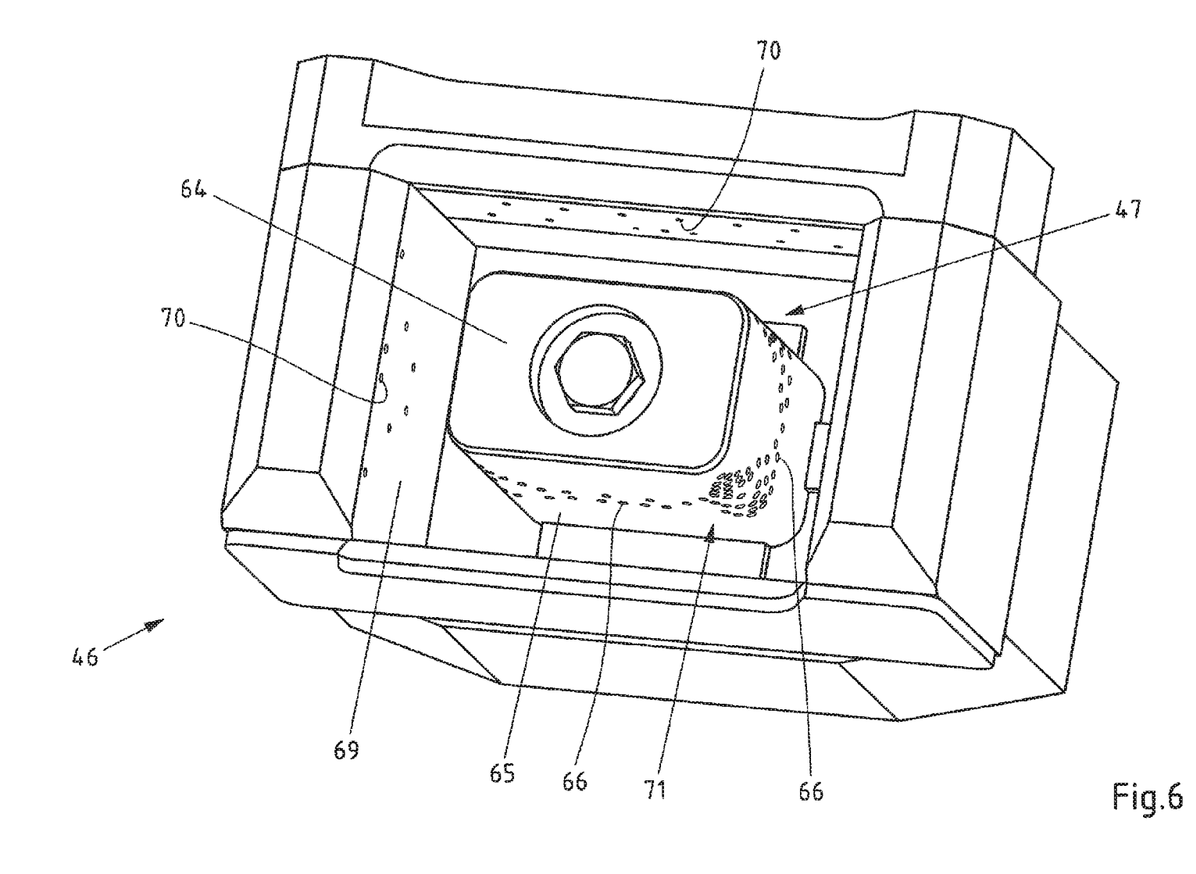
FIG. 6 shows the nozzle unit of the heating device according to FIG. 4 in a perspective view and FIG. 7 shows the heating device from FIG. 4 in a cross-sectional view.

The nozzle unit 46 is illustrated as a detail in FIG. 6. The circumferential gap 47 for receiving one end of a package sleeve 6 and the openings 66 in the inner wall 65 and the outer wall 69 of the gap 47 can be recognised. Fewer openings 70 are provided in the outer wall 69, which overall also form a smaller opening area than the openings 66 in the inner wall 65. There are more of the latter numerically and together they also form a larger opening area. In addition, the openings 66 of the inner wall 65 are predominantly arranged in the corner areas of the gap 47. The openings 66 also form a V-shaped contour 71 in these corner areas.

Figure 7:
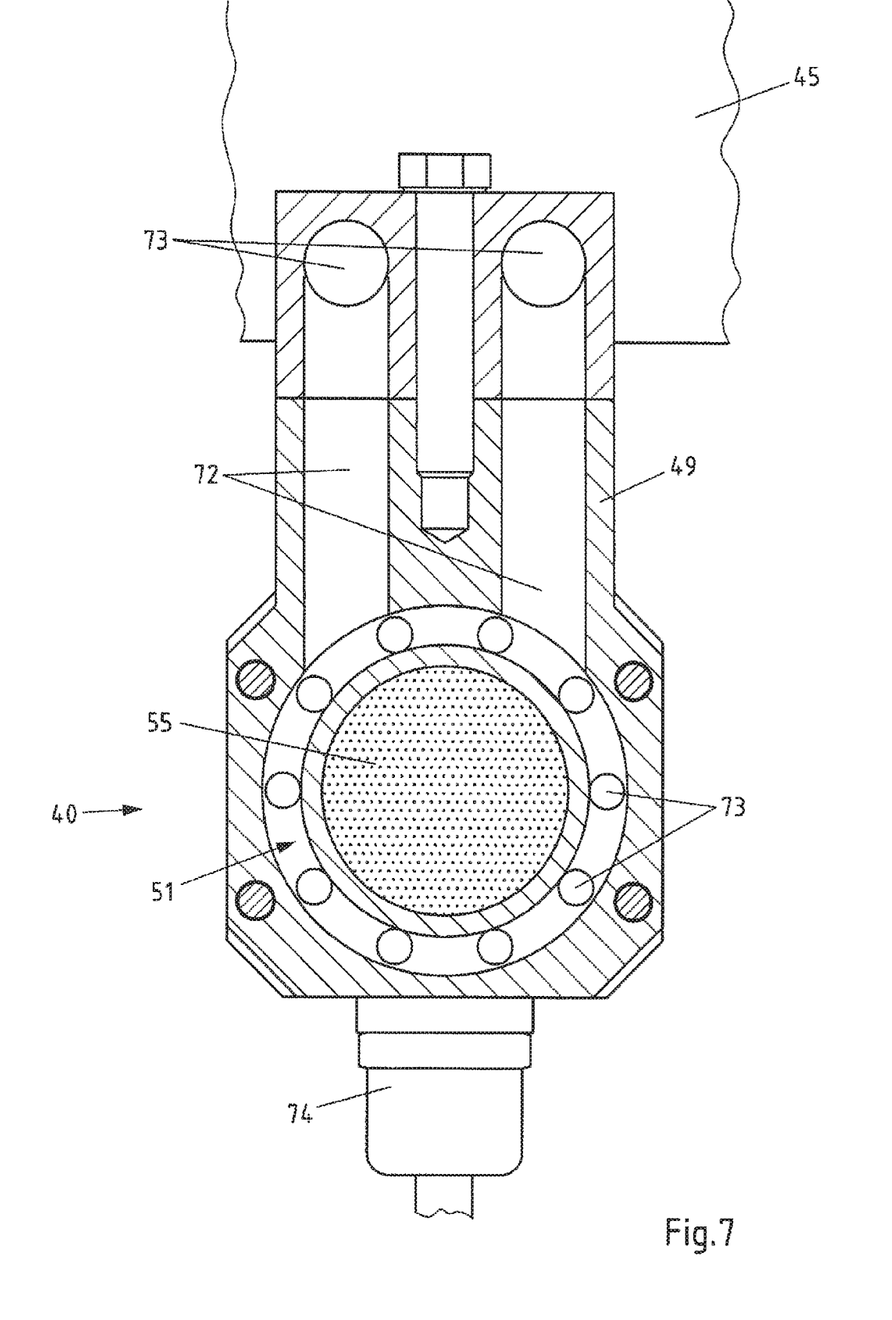

In FIG. 7, a heating device 40 is illustrated in a cross-section of the height of the front holder 49. It can be identified that the holder 49 has two essentially parallel channels 72 which are connected to the distribution pipe 45 of the air supply device 41 via openings 73. Air to be heated therefore flows out of the distribution pipe 45 via the two channels 72 of the holder 49 and via a row of openings 73 distributed peripherally in relation to the annular gap 51 into the annular gap 51 which in particular is illustrated in FIG. 5. The porous heating element 55 is illustrated encompassed by the annular gap 51. A connection 74 for electrically connecting the heating element 55 to the power supply is provided on the rear part of the heating device 40.

Since the holder 49, which is provided on the hot end of the heating device 40 abutting on the nozzle unit 46, has channels 72 for air to be heated to flow through, the holder 49 is cooled from the inside. The heat is therefore partly via the air to be heated conveyed back into the heating device 40 again. In addition, the distribution channel 45 is cooled from the inside by the air to be heated, which further ensures that the areas of the heating unit 11 with a very high temperature are very localised and the adjacent heating devices 40 do not or only slightly thermally affect one another. Therefore, also only localised considerable thermal expansion is to be expected, which is tolerable there and does not or does not appreciably impair the function of the heating devices 40. Thermal expansion exceeding this, which in particular alters the distance between the heating devices 40, can to the greatest possible extent be prevented. Consequently, the package sleeves 6 can be partially heated in a very precise and efficient way.

The invention claimed is:

1. An apparatus for filling packages having a heating unit for at least partially heating with hot air end areas to be sealed of package sleeves arranged on different mandrel wheels, having a sealing unit for closing and welding the end areas of the heated package sleeves arranged on different mandrel wheels in a liquid-tight manner and having a filling device for filling the package sleeves closed on at least one side, wherein the heating unit comprising a plurality of heating devices for at least partially heating with hot air end areas of package sleeves arranged on different mandrel wheels to be sealed, wherein the heating unit has an air supply device for supplying air to be heated to the heating devices, wherein the heating devices each have an electrical heating element for producing hot air and a nozzle unit for blowing hot air produced in the heating device against the end area of the package sleeve, wherein the heating devices are each separately connected to the air supply device by means of at least one holder and are each separately held on the air supply device by means of the at least one holder, wherein the at least one holder in each case has at least two separate channels connected to a distribution pipe of the air supply device for supplying air to be heated to the heating devices, wherein the heating devices are each separately held on the distribution pipe of the air supply device by means of the at least one holder, and wherein the distribution pipe is fluidly connected to the air supply device via a plurality of connection channels.

2. The apparatus according to claim 1, wherein the heating elements of the at least two heating devices are in each case fluidly connected to the air supply device by means of the at least one holder, and wherein the at least two heating devices are designed exclusively to be supplied with air to be heated by means of the holder.

3. The apparatus according to claim 1, wherein the at least one holder is provided on an area of the heating device assigned to the nozzle unit and/or to the heating element.

4. The apparatus according to claim 1, wherein the heating devices are each separately connected to the air supply device by means of at least two holders and are each separately held on the air supply device by means of the at least two holders.

5. The apparatus according to claim 1, wherein a regulating unit is provided for regulating the rate of flow of air to be heated to the heating element, and wherein the regulating unit has an annular gap with an alterable free flow cross-section.

6. The apparatus according to claim 1, wherein the width of the gap is less than 3 mm.

7. The apparatus according to claim 1, wherein the heating devices each have at least one channel, including an annular channel for conducting the air to be heated outside of the heating element, and wherein the heating element is designed such that the heating air is at least partly conveyed in the opposite direction to the air to be heated in the channel outside the heating element in the direction of the nozzle unit.

8. The apparatus according to claim 7, wherein the channel of the heating devices is provided at least partly circumferentially to the heating element.

9. The apparatus according to claim 7, wherein the channel of the heating devices and the heating element of the heating devices are designed such that the air in the channel and the air in the heating element flows in opposite directions to one another.

10. The apparatus according to claim 1, wherein the nozzle unit has an in particular square or rectangular circumferential gap for receiving one end of a package sleeve, and wherein the gap is delimited by an inner wall with openings for hot air to flow out of and/or by an outer wall with openings for hot air to flow out of.

11. The apparatus according to claim 10, wherein the entire opening area of the inner and/or of the outer wall formed by the individual openings is larger in at least one corner area of the gap than outside the corner areas.

12. The apparatus according to claim 10, wherein the contour of the openings of the inner and/or of the outer wall is V-shaped in at least one corner area of the gap.

13. A method for forming packages, comprising:
providing an apparatus as claimed in claim 1;
at least partially inserting the end areas of the package sleeves that are arranged on different mandrel wheels into a gap of at least two of the heating devices in order to heat the end areas in parallel and in the gap hot air is blown against the end areas,
sealing the at least partially heated end areas of the at least two package sleeves,
supplying air to be heated to the at least two heating devices by means of an air supply device, and
in which the at least two heating devices are each separately held on the air supply device by means of at least one holder.

* * * * *